(12) United States Patent
Erhardt

(10) Patent No.: US 8,762,223 B2
(45) Date of Patent: Jun. 24, 2014

(54) METHOD FOR OPERATING A TRADING PLATFORM, TRADING PLATFORM, COMPUTER PROGRAM PRODUCT, AND COMPUTER SYSTEM

(76) Inventor: Benjamin Erhardt, Leonberg (DE)

( * ) Notice: Subject to any disclaimer, the term of this patent is extended or adjusted under 35 U.S.C. 154(b) by 152 days.

(21) Appl. No.: 13/344,691

(22) Filed: Jan. 6, 2012

(65) Prior Publication Data

US 2012/0185345 A1 Jul. 19, 2012

(30) Foreign Application Priority Data

Jan. 14, 2011 (DE) .......................... 10 2011 002 733

(51) Int. Cl.
*G06Q 30/00* (2012.01)
(52) U.S. Cl.
USPC .......................................... 705/26.3; 705/26.1
(58) Field of Classification Search
USPC ........................................ 705/26.1, 27.1, 26.3
See application file for complete search history.

(56) References Cited

U.S. PATENT DOCUMENTS

| | | | |
|---|---|---|---|
| 6,718,312 B1 * | 4/2004 | McAfee et al. .................. | 705/37 |
| 7,555,445 B2 * | 6/2009 | Moya et al. .................. | 705/26.3 |
| 2008/0249923 A1 * | 10/2008 | Douglas et al. ................. | 705/37 |

OTHER PUBLICATIONS

Segal, I, "Optimal pricing mechanisms with unknown demand," Jun. 2003, The American Economic Review, 93(3), 509.*
Excerpt from a book by Hal R. Varian, "Intermediate Microeconomics: A Modern Approach", 8th Edition, ISBN 978-0393934243, Norton 2010, 40 Pages.
Excerpt from a book by Milton Friedman, "Price Theory", ISBN 978-0202309699, Aldine Pub. 2007, 29 pages.
Excerpt from a book by Flavio M. Menezes and Paulo K. Monteiro, "An Introduction to Auction Theory", ISBN 978-0199275991, Oxford University Press 2008, 14 pages.

* cited by examiner

*Primary Examiner* — Brandy A Zukanovich
(74) *Attorney, Agent, or Firm* — Lipsitz & McAllister, LLC

(57) ABSTRACT

The invention relates to a method for operating a trading platform for selling goods using a computer system, the computer system including a communication interface configured for the exchange of information between users and the computer system via at least one communication network, a memory unit for storing information associated with a good to be sold, and a price variation unit, connected to the memory unit and the communication interface, for varying a price associated with the good as a function of time, based on a parameterized price function. The invention further relates to a trading platform, a computer program product, and a computer system.

34 Claims, 4 Drawing Sheets

METHOD FOR OPERATING A TRADING PLATFORM, TRADING PLATFORM, COMPUTER PROGRAM PRODUCT, AND COMPUTER SYSTEM

The present disclosure relates to the subject matter of German priority application No. 10 2011 002 733.5 of Jan. 14, 2011, priority of which is claimed herewith and which is incorporated herein by reference in its entirety and for all purposes.

BACKGROUND OF THE INVENTION

1. Field of the Invention

The invention relates to a method for operating a trading platform for selling goods. In particular, the invention relates to a method for operating a trading platform for selling goods using a computer system, the computer system including a communication interface by means of which users are able to exchange information with the computer system via at least one communication network, and a memory unit for storing information associated with a good to be sold.

The invention further relates to a trading platform.

The invention further relates to a computer program product having a computer-readable medium, and a computer program having program code which is stored on the computer-readable medium.

The invention further relates to a computer system which includes a communication interface by means of which users are able to exchange information with the computer system via at least one communication network, and a memory unit for storing information associated with a good to be sold using the computer system.

2. Description of Related Art

Trading platforms of the aforementioned type and methods for operating same are known, in which users offer goods for sale which may be purchased by other users. For example, there are trading platforms in which goods are offered by offering users at a fixed price. In such trading platforms, the offering users are generally not allowed to vary the price of goods offered. By comparing offers for identical goods, an inquiring user may identify a sales price that is favorable for him; however, this is very time-consuming. In addition, this often does not favor the interests of the offering users, since the offering users are thus subjected to intense pricing pressure, to the point of restriction to a limited assortment of goods, which is not necessarily desired by the offering user.

Trading platforms are also known in which the price for a good to be sold by an offering user is varied over time, for example in the manner of an auction. For example, the price is increased over time. This does not favor the interests of an inquiring user, since in practice it shows that price distortions are unavoidable as the result of anonymous competitive bidding by an offering user. In other trading platforms, the price for a good drops over time, beginning at a starting price and ending at an end price at which the offer is terminated, and the first inquiring user who transmits a purchasing decision is awarded the winning bid for the good. Such a method is contrary to the interests of both the offering user and the inquiring user, since, due to the recognition of the continuously falling price, purchasing decisions are delayed to such an extent that in practice, frequently no purchasing decision is made within the offering period. Thus, goods are not sold, and the inquiring user is referred to a new sales process, so that such a method is also contrary to the interests of an operator of the trading platform.

BRIEF SUMMARY OF THE INVENTION

It is an object of the present invention to provide a method for operating a trading platform of the type mentioned at the outset, in which preferably short trading times for traded goods may be achieved with the greatest possible safeguarding of the interests of the offering user as well as the inquiring user, it being ideally possible to determine an actual market price for a traded good. It is a further object to provide a method for operating a trading platform in which, due to short trading times for traded goods while achieving preferably small data volumes between users and the computer system which provides the trading platform, a higher number of goods may be handled than is the case for conventional methods.

This object is achieved according to the invention by a method for operating a trading platform for selling goods using a computer system, the computer system including a communication interface configured for the exchange of information between users and the computer system via at least one communication network, a memory unit for storing information associated with a good to be sold, and a price variation unit, connected to the memory unit and the communication interface, for varying a price associated with the good as a function of time, based on a parameterized price function, in which method the trading platform carries out a sales process for selling the good, in which a price of the good determined by the price variation unit according to the price function is provided to a user via the at least one communication network, wherein the user transmits to the computer system via the at least one communication network a purchasing decision for purchasing the good at a current price, wherein during the sales process, beginning from a start of the offer in which the good is offered at a starting price, the price drops according to the price function during a maximum offering period, in which no purchasing decision is made, until an end of the offer, in which the good is offered at a minimum price that is below the starting price, the price function passing through at least one minimum between the start of the offer and the end of the offer.

In the method according to the invention, the price variation unit varies the price of the offered good during a sales process according to a price function, the course of the price before the sales process begins being set by the price variation unit. In principle, it is provided that the price, beginning at a starting price and ending at a minimum price which is below the starting price, drops (not necessarily in a monotonic or strictly monotonic manner), the minimum price being present when a maximum offering period for the good to be sold has elapsed. This favors the interests of an inquiring user, who generally is interested in a falling purchase price. According to the invention, the price function passes through at least one minimum between the start of the offer and the end of the offer; i.e., the price reaches a minimum during the sales process, and before reaching the minimum the price drops at least once, based on the start of the offer, and after passing through the minimum, the price increases at least once until the end of the offer. Passing through a minimum favors the interests of the offering user, since it reduces the risk of a price drop for the good offered by him. Since, by observing the developing price during the sales process, inquiring users are able to determine that the price function has passed through the minimum, they do not delay their purchasing decision until the maximum offering period is reached and the sales process has ended, as is the case, for example, for the above-described method having a continuously falling price. This increases the likelihood that a purchasing decision is made during the maximum offering period, which favors the interests of the offering user as well as the operator of the trading platform. In addition, at the same time this is in accord with the interests of the inquiring user, since, due to the passing through the at least one minimum, an inquiring user has a specific incentive to decide on purchase of the offered good. Thus, by using the method according to the invention, it is possible to fairly balance interests, and at the same time the quantity of transferred goods within a specified time period may be increased. This is achieved with acceleration of the trading time, and thus, at the same time also with reduction of data traffic between the users and the computer system which is necessary for selling a good.

The price variation unit may be implemented in the computer system via hardware or software, for example in an integrated circuit and/or as a computer program which is executable on a microprocessor.

In addition, the method according to the invention may be similarly implemented in the computer system via hardware or software, as well as the advantageous variants of the method according to the invention described below. A non-computer-assisted implementation of one of the described methods is also conceivable.

In the present context, "computer system" is any device or aggregate of devices which is/are able to process data by means of a programmable instruction. In particular, the computer system may comprise more than just one computer, for example a network of interconnected computers.

In the present context, "communication network" is any type of infrastructure via which data may be exchanged, using any type of protocol. In particular, the communication network is the Internet, but in particular may also be a telecommunication network.

In the present context, "memory unit" is a device for nonvolatile and modifiable storage of data of any type.

In the present context, "good" is not limited to a specific embodiment, so that a good may, in the present case, also be a provision of service, in particular any type of service to be provided. In the present context, "similar goods" are regarded, for example, as goods having common features, for example in their material composition, their customary intended purpose, their customary use, their characteristic features and suitability as competing or mutually complementary goods or services, their manufacturing site, their sales channels, or their sales locations (material relatedness).

In the present context, "price" means the value to be provided by the purchasing user to purchase the good; the value is not limited to a specific currency. In the present context, the price may be indicated with or without inclusion, for example, of incidental sales costs such as shipping costs or commissions.

It is favorable for the price function to pass through exactly one minimum in order to preferably reduce the time period from the start of the offer to the purchasing decision.

The price function advantageously passes through a local minimum; i.e., in the local minimum the price is higher than the minimum price at the end of the offer at the maximum offering period. This proves to be particularly advantageous when the minimum price, as explained below, is a minimum price for the offered good which is (just) acceptable by the offering user. This ensures that the method favors the interests of the offering user to an even greater extent. A price drop for the offered good contrary to the interests of the offering user is thus avoided.

It proves to be favorable when the method is made dynamic. In particular, it is advantageous when the price variation unit determines the price in the at least one, and in particular local, minimum based on at least one prior sales process for an identical good. Information which may be obtained from prior sales processes for an identical good may thus be taken into account in determining the price development for an upcoming sales process. Information relating to prior sales processes is stored in particular in the memory unit and sorted by categories in which the goods are classified.

If a good of a certain type is being offered for sale for the first time via the trading platform, a set of parameters for the first-time determination of the course of the price for an upcoming sales process may be stored in the manner of a blueprint in the memory unit, for example according to the type of good and classified in goods categories.

An advantageous matching of interests of offering users and inquiring users may be favorably achieved by the price variation unit, in order to determine the price in the local minimum, taking into account the purchase price for an identical good of at least one prior sales process.

For example, the absolute purchase price for an identical good may be taken into account. However, for determining the price in the local minimum, it is more meaningful, and thus more advantageous, for the price variation unit to determine a ratio from the difference between the purchase price and the minimum price relative to the difference between the starting price and the minimum price of the at least one prior sales process, and to determine the price in the local minimum as the minimum price plus the ratio times the difference between the starting price and the minimum price of the upcoming sales process. This takes into account the fact that the absolute purchase price of a prior sales process could be greater than the starting price and/or less than the minimum price of the upcoming sales process, which is of relevance when both the starting price and the minimum price are specified by the offering user. The interests of the offering user are taken into consideration to a greater extent by including the ratio of the at least one sales process in the calculation of the price in the minimum of the upcoming sales process. The ratio corresponds to a balancing of the interests of a purchasing user and of an offering user within the price range extending from the starting price to the minimum price. This ratio may thus be regarded as a type of "equilibrium price" for an offered good which corresponds to the actual market price for a good when the starting price is above, and the minimum price is below, the purchase price. Thus, by using this variant of the method according to the invention, it is also possible to determine in a quick and technically simple manner the actual market price of a traded good. A market value of a good according to an ideally functioning exchange market character may correspondingly be determined in a particularly technically simple manner by recording purchase prices of identical goods, determined as described above, as a function of time.

It is advantageous for the price variation unit to take a plurality of prior sales processes into account in order to level out the influence of individual statistical outliers in determining the price development for an upcoming sales process. For example, it may be provided that 100 prior sales processes are taken into account.

Prior sales processes are preferably weighted differently in the determination, in particular more recent sales processes being weighted more heavily than less recent sales processes. This takes into account the fact that the equilibrium price for a certain good may vary over the long term, but the equilibrium price at a given offering time may be greatly influenced by purchase prices realized in the recent past.

It is advantageous for the price function to pass through at least one subsequent maximum after passing through the at least one minimum and before the end of the offer. This ensures that the price between the at least one maximum and the end of the offer, at which the minimum price is present, drops in order to preferably ensure the sale of the good within the maximum offering period. If the minimum price is below the price in the minimum, the drop in the price from the at least one subsequent maximum to the end of the offer corresponds to a "final sale," in a manner of speaking. The falling price favors the interests of the inquiring user, and the sale of the good favors the interests of the offering user and the operator of the trading platform.

The trading time may advantageously be shortened by the price function passing through exactly one subsequent maximum after passing through the at least one minimum and before the end of the offer.

The price in the subsequent maximum is preferably equal to the starting price, in particular when the starting price is specified by the offering user. This favors the interests of the offering user, avoids a price drop after the at least one minimum, and safeguards the price level for the offered good.

It is advantageous for the price function to pass through at least one preceding maximum after the start of the offer and before the at least one minimum. The phenomenon, observed in practice, that inquiring users are willing to pay higher than market prices, in particular for goods in great demand, may thus be taken into account. This is particularly advantageous when the starting price is specified by the offering user.

The trading time is advantageously minimized by the price function passing through exactly one preceding maximum.

It is advantageous for the price in the preceding maximum to be higher than the starting price, in particular when the starting price is specified by the offering user, in order to achieve short trading times for goods in great demand.

The ratio of the time period from the start of the offer to the at least one minimum on the one hand to the time period from the at least one minimum to the at least one subsequent maximum on the other hand is preferably independent of the maximum offering period of the sales process. It may thus be ensured that the form of the price function, and thus the development of the price within the sales process, is the same for all sales processes, regardless of the actual offering period. The advantages described above and to be discussed below are thus achieved for all goods traded using the method.

It may be provided in particular that the time period from the start of the offer to the at least one minimum is the same or substantially the same as the time period from the at least one minimum to the at least one subsequent maximum in order to achieve a balance between the interests of the inquiring user and the offering user.

For the same reasons as mentioned for the next to last method variant described, it is advantageous when the ratio of the time period from the at least one minimum to the at least one subsequent maximum on the one hand to the time period from the at least one subsequent maximum to the end of the offer on the other hand is independent of the maximum offering period of the sales process.

In particular, it may be provided that the time period from the at least one minimum to the at least one subsequent maximum is the same or substantially the same as the time period from the at least one subsequent maximum to the end of the offer. A balance between the interests of the inquiring user, the offering user, and the operator of the trading platform may thus be achieved.

For the same reasons as mentioned for the fourth to last method variant described, it is advantageous when the ratio of the time period from the start of the offer to the at least one minimum on the one hand to the time period from the at least one subsequent maximum to the end of the offer on the other hand is independent of the maximum offering period for the sales process.

In particular, it may be provided that the time period from the start of the offer to the at least one minimum is the same or substantially the same as the time period from the at least one subsequent maximum to the end of the offer. This likewise ensures a matching of the interests of the inquiring user, the offering user, and the operator of the trading platform.

It has previously been mentioned that the starting price is specified to the price variation unit, before the start of the sales process, by a user offering a good. This meets the interests of the offering user in declaring his desired price for the good.

Preferably, the minimum price is correspondingly specified to the price variation unit, before the start of a sales process, by a user offering a good. The user is thus able to represent his interest concerning the particular minimum price (for example, including any fees or the like) at which he is still willing to sell the good.

The actual minimum price is advantageously determined by the price variation unit based on a minimum price specified to the unit by the user before the start of the sales process, the actual minimum price being higher than the specified minimum price, but at least lower than the starting price. It may thus be ensured that a minimum revenue range is achieved which may be supplied to the operator of the trading platform, for example. Since, as mentioned above, the actual minimum price is included in the determination of the price in the local minimum, it is also ensured that the price in the local minimum itself cannot be predicted by users when they observe a multiplicity of purchasing processes for identical goods. The intentional delaying of purchasing decisions by observing the price development of a sales process in progress may thus be avoided. This serves to match the interests of all participants.

It is advantageous when the actual minimum price is determined by the price variation unit by making use of the random principle, wherein, for example, the price variation unit randomly increases the minimum price specified to it by a certain price difference to reach the actual minimum price. The risk of "discovering" the method may be further reduced in this way.

It may be provided that the price variation unit ensures that the actual minimum price does not exceed a predefinable minimum threshold price in order to ensure a minimum trading margin between the actual minimum price and the starting price. This ensures that a sufficient price variation in the course of the sales process is discernible to an inquiring user in order to influence his purchasing decision.

The price variation unit preferably determines the maximum offering period as a function of at least one prior sales process for the same or an identical good. It may thus be ensured that the sales process is made dynamic also with respect to time. In this way the method is sufficiently adaptable to actual circumstances, such as the absence of a purchasing decision within the maximum offering period, or adaptation to the offering period for future sales processes as a function of time periods which have actually elapsed from the start of the offer to the purchasing decision.

For the very first sales process of a good, the length of the initial maximum offering period, for example, may be stored in the memory unit. This period is longer, for example, the higher the value of the offered good.

It proves to be advantageous that, if no purchasing decision appears within the maximum offering period, a further sales process is carried out in order to favor the interests of the offering user in selling the good.

The price variation unit preferably extends the maximum offering period of the further sales process to ensure that inquiring users have a longer opportunity to become aware of the offered good.

For example, it may be provided that the variation unit doubles or substantially doubles the maximum offering period for the further sales process relative to the maximum offering period of the completed sales process.

It is advantageous for the price variation unit to determine the maximum offering period for the further sales process, by making use of the random principle. "Discovering" of the price development for the further sales process by inquiring users may thus be avoided, since the user is not able to determine precisely the time to elapse at which the at least one minimum is reached. This serves to bring about a mutual alignment of the interests of all participants.

It is advantageous when it is determined whether the change in price per unit time for the upcoming sales process is less than a lower threshold value, in this case the upcoming sales process being cancelled, and a message to this effect being sent to a user offering the good. A minimum change in price per unit time during a sales process may thus be ensured, which is regarded as advantageous overall for proper functioning of the method. The communication to the offering user may, for example, contain a request to redefine the starting price and the minimum price, in particular to lower the starting price for a new offering of the good in keeping with the interests of inquiring users.

It is an object of the present invention to trade the greatest possible number of goods within a certain time period, using the method according to the invention. To this end it is advantageous that when a purchasing decision is present during the sales process, the maximum offering period of a further sales process for an identical good is decreased. This allows the number of sales processes to be increased.

In particular it is advantageous when the period of time that has actually elapsed from the start of the offer to the purchasing decision in the completed sales process is taken into account by the price variation unit in determining the maximum offering period for the further sales process. The period of time that has actually elapsed from the start of the offer to the purchasing decision, or the trading time, is a measure of the maximum time within which a sale of the offered good is possible. To allow even quicker sale of the good, it is therefore advantageous to use the period of time that has actually elapsed as the maximum offering period for the further sales process in order to increase the number of sales processes.

The maximum offering period of a further sales process is advantageously determined from the ratio of the elapsed period of time of the completed sales process relative to the maximum offering period of the completed sales process, multiplied by the standardized maximum offering period which is stored for an identical good at the time of the determination, the standardized maximum offering period being the shortest elapsed period of time for a purchasing decision in a prior sales process for an identical good. The standardized maximum offering period is thus a measure of the maximum period of time within which a good of this type should be sold at the latest. The standardized maximum offering period may be associated with the good and stored in the memory unit, for example by category according to the type of good, it being possible to check after each successful sales process whether the offering period has fallen below a heretofore standardized maximum offering period. If this is the case, the new, decreased standardized maximum offering period is stored.

It proves to be advantageous for the price variation unit to determine whether the maximum offering period for the further sales process is less than a predefinable minimum offering period, in this case the stored standardized maximum offering period being selected as the maximum offering period for the further sales process. This ensures that each sales process has a minimum offering period which may be set to a different length, for example according to the type and category of the good. If the price variation unit determines a maximum offering period which is less than the minimum offering period, the subsequent sales process is based on the standardized maximum offering period already stored, which is not changed.

As shown in particular by the above discussion regarding the lengthening and shortening of the maximum offering period of sales processes, it proves to be advantageous for the form of the price function to be independent of the maximum offering period; i.e., in particular the time from the start of the offer to the at least one minimum, from the at least one minimum to the at least one subsequent maximum, and from the at least one subsequent maximum to the end of the offer in each case constitutes approximately one-third of the maximum offering period.

As previously mentioned, the invention further relates to a trading platform. A trading platform according to the invention is characterized in that it is operated according to one of the above-described methods. The trading platform may, for example, be implemented via hardware and/or software and operated using a computer system.

As also previously mentioned, the invention further relates to a computer program product.

It is an object of the invention to provide a computer program product by means of which one of the above-described methods may be carried out.

This object is achieved by a computer program product according to the invention having a computer-readable medium and a computer program having program code stored on the computer-readable medium which is configured for carrying out one of the above-described methods when the computer program is run on a computer system.

The advantages that are achievable in conjunction with the explanation of the method according to the invention and in conjunction with the explanation of advantageous variants of the method according to the invention may be realized using the computer program product.

The computer program may be a computer program written in any programming language; the language may be an interpreter language or a compiler language, for example.

As previously mentioned, the invention further relates to a computer system. It is an object of the invention to provide a computer system of the type mentioned at the outset by means of which one of the above-described methods may be carried out.

This object is achieved by a computer system according to the invention, including a communication interface configured for the exchange of information between users and the computer system via at least one communication network, a memory unit for storing information associated with a good to be sold using the computer system, and a price variation unit, connected to the memory unit and the communication interface, for varying a price associated with the good as a function of time, based on a parameterized price function, the computer system being designed and programmed to carry out one of the above-described methods.

The advantages explained using the method according to the invention and using advantageous variants of the method according to the invention may likewise be achieved using the computer system.

BRIEF DESCRIPTION OF THE DRAWINGS

The following description of advantageous exemplary embodiments of the invention is used, in conjunction with the drawings, to explain the invention in greater detail.

DETAILED DESCRIPTION OF THE DRAWINGS

Figure 1:
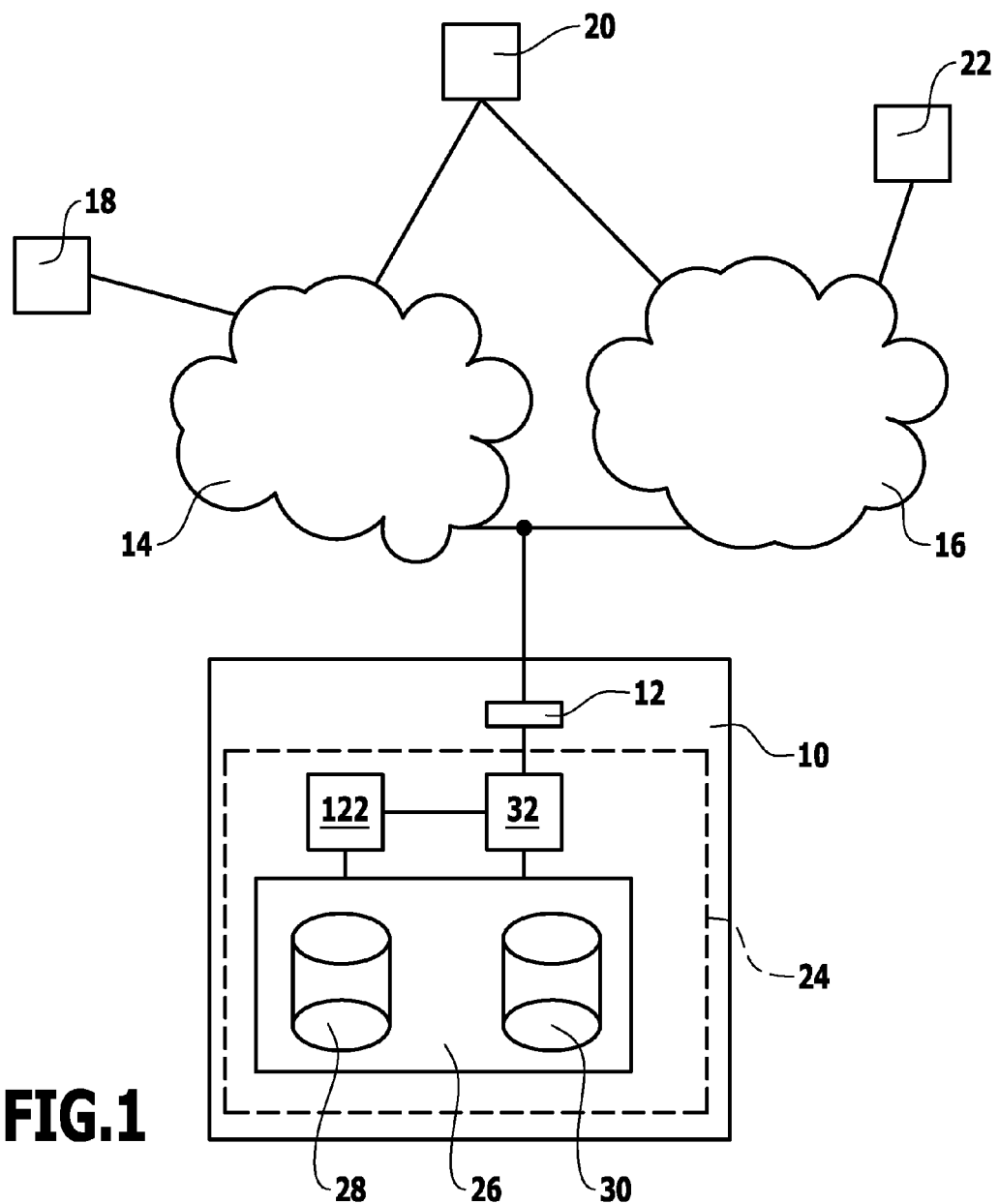
FIG. 1: shows a block diagram of a computer system, via which a plurality of users are in connection via two communication networks, and by means of which a method according to the invention may be carried out.

FIG. 1 schematically illustrates a computer system 10 having a communication interface 12 by means of which the computer system 10 may be connected to a plurality of communication networks, of which two communication networks 14 and 16 are illustrated in the drawing by way of example. The communication networks 14 and 16 may be communication networks of any type; for example, communication network 14 may be the Internet, and communication network 16 may be a telecommunication network.

A plurality of users, shown with reference to three users 18, 20, and 22 by way of example, may likewise be connected to the communication networks 14 and 16, and thus, to the computer system 10. Using the user 20 as an example, it is schematically illustrated that a user may also be connected to the computer system 10 via more than one of the communication networks 14, 16.

By use of the computer system 10, a trading platform 24 is provided for selling goods which are offered by the users 18 to 22 and which may be inquired about. In this regard, it may be provided that each of the users 18 to 22 is able to offer goods as well as sell goods. However, a user 18 to 22 cannot at the same time act as a purchaser of a good which is offered by that user himself.

The computer system 10 may be a single computer, although the computer system may also be a group of a plurality of interconnected computers.

The computer system 10 includes a schematically illustrated memory unit 26 for storing goods-related data in a first database 28. Additional data may be stored in further databases, illustrated using the example of a user-related database 30. Data concerning goods which are traded via the trading platform 24 are stored in the database 28. This involves data concerning individual traded goods as well as data concerning a systematic association of classifications of the goods into goods categories.

Figure 2:
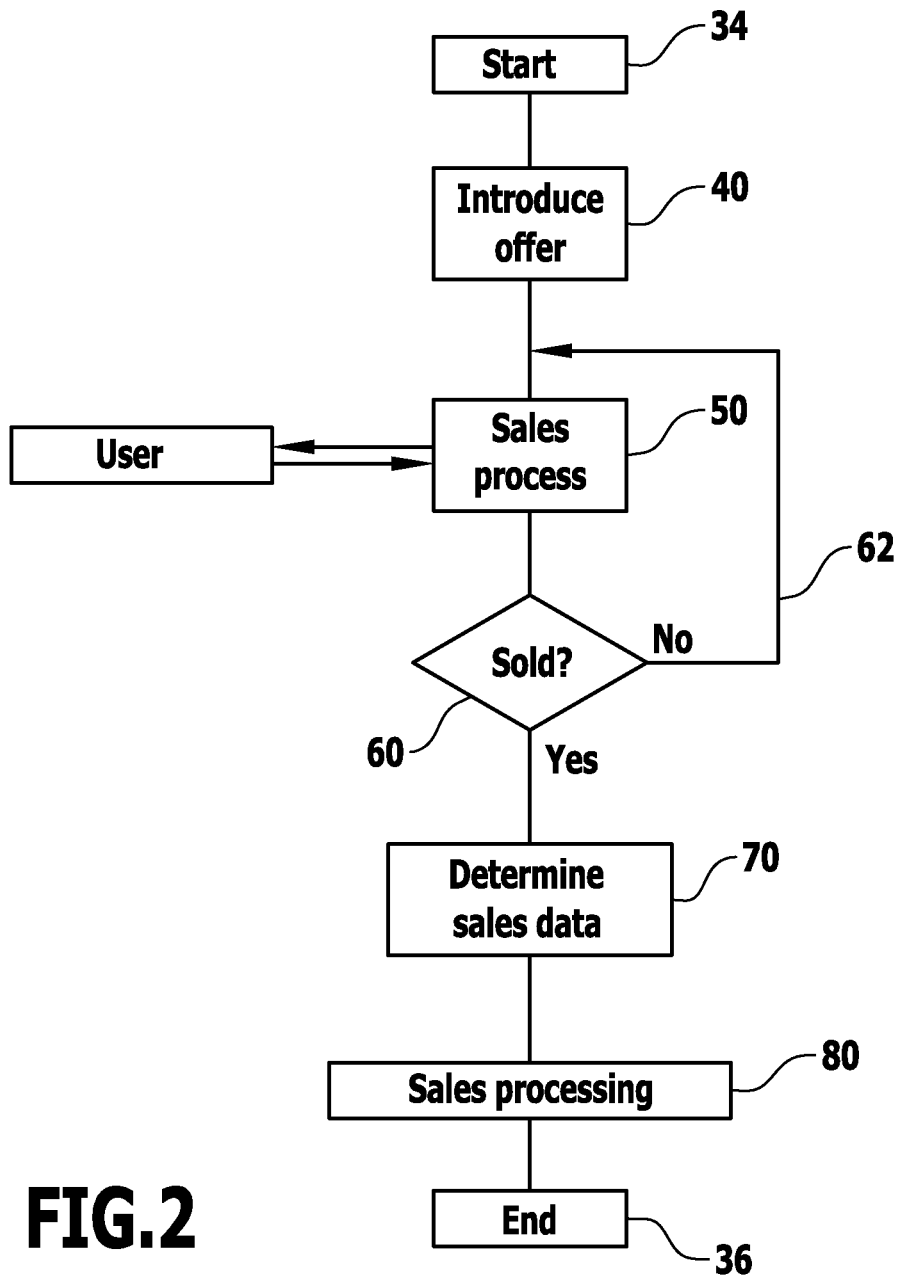
FIG. 2: shows a flow diagram which schematically illustrates the sequence of the method according to the invention.
Figure 3:
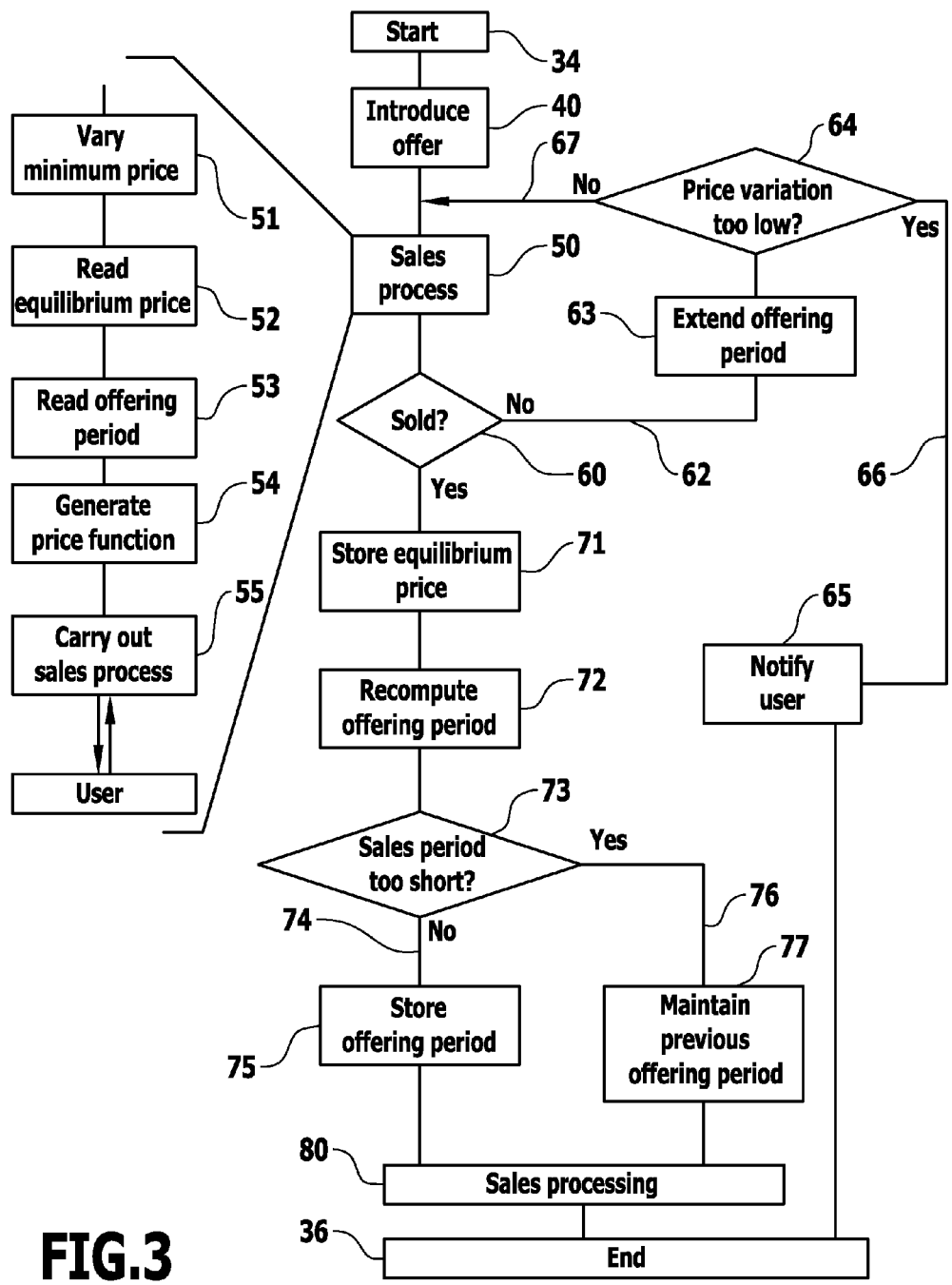
FIG. 3: shows a flow diagram which illustrates the sequence of the method according to the invention schematically and in greater detail.

The computer system 10 also includes a price variation unit 32 which is connected to the memory unit 26 and the communication interface 12. The price variation unit 32 may be implemented in the computer system 10 via hardware or software, for example in an integrated circuit and/or as a computer program which is executable on a microprocessor, by means of which the method steps and in particular program steps explained below with reference to FIGS. 2 to 4 may be carried out. Such a computer program may, for example, involve a runtime interpreter language or a compiler language.

Similarly, the method proposed herein may be implemented as a whole or in part in the computer system 10 via hardware or software, for example in an integrated circuit and/or as a computer program that is executable on a microprocessor.

As mentioned, the users 18 to 22 may sell goods via the trading platform 24. A simplified schematic method sequence for operating the trading platform 24, illustrated in FIG. 2 in a simplified form and in FIG. 3 in detail, in each case as a flow diagram, begins at a start 34 and terminates at an end 36. An offering user, for example user 18, introduces, in a step 40, a good to be sold on the trading platform 24. This is effected, for example, by the user 18 transmitting, to the computer system 10 via the communication network 14, information associated with the good to be sold, which the computer system 10 stores in the memory unit 26, in particular the database 28. The information is stored in the database 28 as a function of the type of good, the goods traded on the trading platform 24 being classified overall into a multiplicity of categories, wherein identical and similar goods may be aggregated in the same category, preferably with the equilibrium price and the standardized offering period (see below) for this category of goods.

A description and/or pictorial illustration, for example, of the offered good is available as information from the user 18. In addition, the user 18 transmits to the computer system 10 his desired price for the good, referred to below as the starting price 42, which is identifiable by the price curve schematically illustrated in FIG. 4. The user 18 also specifies to the computer system 10 a minimum price 44, corresponding to his desired minimum price which is to be obtained upon sale of the good, and which may also include incidental sales costs such as for example shipping costs, transaction costs, and/or sales commissions to the operator of the trading platform 24. The starting price 42 and the minimum price 44 are likewise stored in the database 28.

The sales process for the offered good is subsequently carried out by the trading platform 24 in interaction with the user in a step 50. This is described in detail below. It is first noted, however, that the price variation unit 32 transmits, to inquiring users, for example the users 20 and 22, via the communication interface 12 and as a function of time, a price, which is variable over time, for the good. Conversely, the users 20 and 22 may transmit to the computer system 10 a purchasing decision to purchase the offered good at the current price which is present when the purchasing decision is transmitted. This subsequently results in a case distinction at step 60 as to whether the offered good has been sold.

For the case that the good has not been sold, the good is reintroduced for sale according to path 62 under assumptions to be explained below, so that a new sales process 50 for the good may begin.

On the other hand, if the good has been sold to the user 20 or the user 22 during the sales process 50, in step 70 the price variation unit 32 is able to determine information on which the sale is based, which may be taken into account for further sales of identical goods. This may be followed by sales processing, denoted by box 80, for example exchange of identities and/or addresses by the user 18 and the user 20 or 22, payment of the purchase price, and/or delivery of the good to the user 20 or the user 22. After the sales processing is completed, the method terminates at the end 36.

Figure 4:
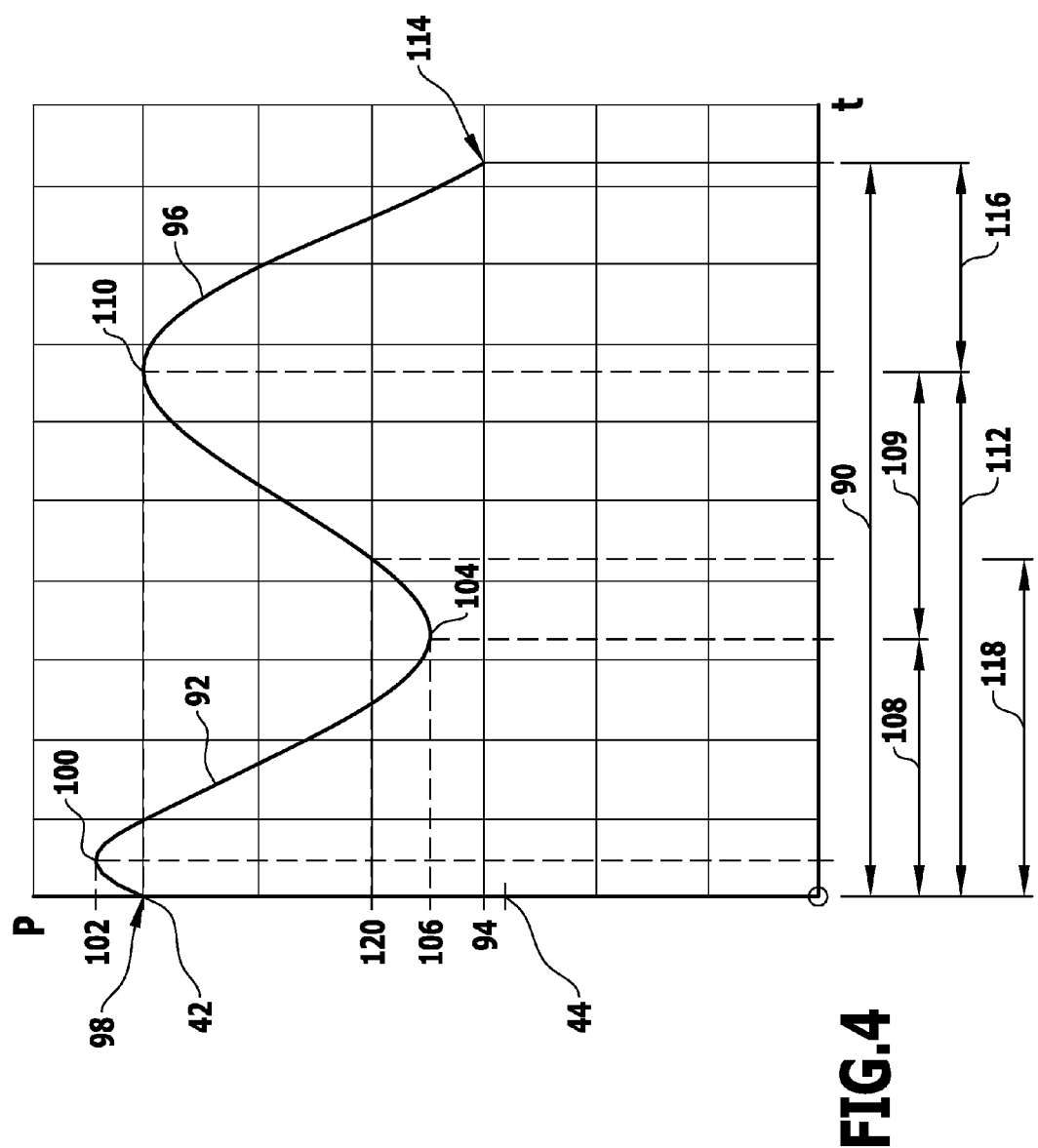
FIG. 4: shows an illustration, by way of example, of the price (P) as a function of time (t) for a good traded using the computer system from FIG. 1, using the method according to the invention in accordance with FIG. 3.

In the method according to the invention, during a sales process the offered good is not offered at a constant price, but rather, is offered at a price that changes over time, as illustrated by way of example in FIG. 4. The sales process 50 is based on a maximum offering period 90 during which the price for the good, symbolized by a curve 92, is varied, beginning at the starting price 42 and ending at an actual minimum price 94.

At the beginning of the sales process 50, in a step 51 the price variation unit 32 determines the actual minimum price 94 based on the minimum price 44 specified by the user 18; in particular, the price variation unit 32 increases the minimum price 44 using the random principle. In this regard, the actual minimum price 94 is the minimum price 44 plus approximately 10% to approximately 15% of the difference between the starting price 42 and the minimum price 44. It may be provided that the price variation unit 32 determines a minimum threshold price between the starting price 42 and the minimum price 44 which cannot be exceeded by the actual minimum price 94, so that a sufficient trading margin always remains between the starting price 42 and the actual minimum price 94.

Within the maximum offering period 90, the price for the offered good drops from the starting price 42 to the actual minimum price 94, in particular not in a monotonic or strictly monotonic manner, but, rather, according to a price function 96 represented by the curve 92 (FIG. 4). In variants of the method, the shape of the curve of the price function may deviate from the shape of the curve illustrated in FIG. 4, but in embodiment of the invention, the curve passes through at least one minimum between the starting price 42 at a start 98 of the offer and the actual minimum price 94 at a latest end 114 of the offer.

In the present example, the price function 96 has a wave-like curve shape, wherein the price, beginning at the starting price 42 at the start 98 of the offer, initially increases to an absolute maximum 100 at which a maximum price 102 is above the starting price 42. Starting at the absolute maximum 100, the price drops back to the starting price 42, and then to a local minimum 104 at which the price is a price 106 in the local minimum 104. A time period 108 elapses from the start 98 of the offer to the local minimum 104 which corresponds to approximately one-third of the maximum offering period 90.

The absolute maximum 100 is reached, for example, after approximately one-sixth of the time period 108, and passing back through the starting price 42 is achieved after approximately one-third of the time period 108.

Starting at the local minimum 104, the price increases once again until it reaches a local maximum 110 at which the price is again equal to the starting price 42. A time period 112 from the start 98 of the offer to the local maximum 110 corresponds to approximately two-thirds of the maximum offering period 90, so that the time period from the start 98 of the offer to the local minimum 104 is the same or substantially the same as a time period 109 from the local minimum 104 to the local maximum 110.

Starting at the local maximum 110, the price drops to the actual minimum price 94, which is reached at an end 114 of the offer after the maximum offering period 90 has elapsed. A time period 116 from the local maximum 110 to the end 114 of the offer is the same or substantially the same as time period 108 and time period 109, and thus likewise corresponds to approximately one-third of the maximum offering period 90.

It may be provided that the ratios of the time periods 108, 109, and 116 are selected to be different from 1:1:1, for example approximately 3:4:3 or approximately 3.5:4:2.5. It is also conceivable for the ratios to be approximately 1:8:1, for example. It is also conceivable for the ratios of the time periods 108, 109, and 116 to be determined by the price variation unit 32 for a sales process, for example as a function of at least one prior sales process for an identical good.

To generate the price function 96 for the sales process for the good offered by the user 18, i.e., the development of the price for the good as a function of the time during the maximum offering period 90, there is read from the memory unit 26, in a step 52 following the step 51, first an equilibrium price, and then in a step 53 a maximum offering period. The price function 96 is determined by the price variation unit 32 in a subsequent step 54, and in a following step 55 the actual sales process is carried out via the trading platform 24.

During the sales process 55, the price variation unit 32 transmits the price for the good, as specified by the price function 96, via the communication interface 12 and the communication networks 14 and 16 to interested users 20 and 22, who may for their part transmit back to the computer system 10 a purchasing decision to purchase the good at the current price. If no purchasing decision by a user is made by the time the maximum offering period 90 expires, the sales process ends.

Step 52, "Read equilibrium price," is carried out to determine the price 106 in the local minimum 104. A ratio of at least one prior sales process for an identical good is regarded as an equilibrium price, which is formed as the ratio of the difference between the purchase price and the actual minimum price to the difference between the starting price and the actual minimum price for the at least one prior sales process, this ratio being computed as a percentage. For example, the ratio is 50% when a purchase price for a good is obtained in the at least one prior sales process which is equal to the arithmetic mean of the starting price and the actual minimum price.

To determine the price 106 in the local minimum 104, the price variation unit 32 adds to the actual minimum price 94 the difference between the starting price 42 and the actual minimum price 94 multiplied by the ratio, thus ensuring that the price 106 in the local minimum 104 is always between the starting price 42 and the actual minimum price 94. In this regard, the price variation unit 32 factors-in a plurality of prior sales processes for an identical good, for example 100 prior sales processes, it being possible for sales processes to be weighted the more heavily the more recent they are. For example, for this purpose a weighted average of the equilibrium prices, i.e., ratios, of the prior sales processes is formed.

In the present example, a purchasing decision by the user 20 is made somewhat after the local minimum 104, but clearly before the local maximum 110, after a trading time or award period 118 computed from the start 98 of the offer, and for a purchase price 120 above the price 106 in the local minimum 104. For the present sale, therefore, an equilibrium price is determined which is specified by the ratio of the difference between the purchase price 120 and the actual minimum price 94 relative to the difference between the starting price 42 and the actual minimum price 94. This ratio is stored in the memory unit 26 in a step 71 within step 70, "Determine sales data." The equilibrium price thus determined may be used in the above-described manner for subsequent sales processes for an identical good in order to generate the corresponding price in the local minimum.

In step 53, "Read offering period," a standardized maximum offering period is read from the memory unit 26, provided that the good offered for sale by the user 18 is introduced for the first time, and not via the path 62. The standardized maximum offering period is the shortest elapsed time period (award period or trading time) for a purchasing decision for a prior sales process for an identical good. This standardized maximum offering period is set by the price variation unit 32 as the maximum offering period 90.

Since in the present case, a purchasing decision by the user 20 has been made after the award period 118, the price variation unit 32 recomputes, in a step 72, "Recompute offering period," the standardized maximum offering period as a component of the step 70, "Determine sales data." In particular, the standardized maximum offering period for subsequent sales processes for identical goods is formed from the ratio of the award period 118 to the maximum offering period 90, multiplied by the standardized maximum offering period (which in the present example is equal to the maximum offering period 90) stored in the memory unit 26 at the present point in time. As a result, for subsequent sales processes for identical goods, the new standardized maximum offering period corresponds to a time period that is equal to the award period 118 for the present sale of the good offered by the user 18.

However, based on a case distinction 73 as a component of the step 70, "Determine sales data," a check is made as to whether the recomputed standardized maximum offering period is less than a predefinable minimum offering period. If this is not the case, the recomputed standardized maximum offering period, corresponding to the award period 118, is stored in the memory unit 26, as mentioned, according to a path 74 and a subsequent step 75, "Store offering period," as a component of step 70, "Determine sales data." However, if the newly determined standardized maximum offering period is less than the predefinable minimum offering period, then according to a path 76 and a subsequent step 77, "Maintain previous offering period," the standardized maximum offering period stored up to that point in the memory unit 26 is maintained and is not further reduced. This ensures that the price development during the sales process occurs slowly enough that it may be still be discerned by the users.

It is assumed below that for the good offered by the user 18, no purchasing decision is made by the users 20 or 22 within the maximum offering period 90. In this case, in a step 63, "Extend offering period," in path 62, the price variation unit 32 extends the maximum offering period for a new sales process for the good. In particular, the maximum offering period 90 is substantially doubled. However, it may be provided that, based on the random principle, the price variation unit 32 makes slight deviations from the doubling of the maximum offering period 90, for example a doubling of the offering period varied by approximately plus or minus 5%.

In a subsequent case distinction 64 in path 62, the price variation unit 32 checks whether the change in the purchase price per unit time, based on the extended maximum offering period, is too low, i.e., is less than a lower threshold value. If this is the case, then in a step 65, "Notify user," within a path 66 starting from the case distinction 64, an appropriate message is sent to the user 18 that his good cannot be sold. This results in termination of the method.

On the other hand, if the variation in the purchase price per unit time, based on the extended maximum offering period, is above the lower threshold value, the good of the user 18 is reintroduced according to a path 67, and a new sales process 50 begins. In this regard it must be taken into account that according to step 51, the minimum price is varied anew by the price variation unit 32. In this case as well, the specified minimum price 44 is varied for a new actual minimum price 94 which is greater than the specified minimum price 44 and which may differ from same due to the use of the random principle. Furthermore, according to step 52 a current equilibrium price for the offered good based on a plurality of prior sales processes is read from the memory unit 26, and based on this value, a new price in the local minimum of the new sales process is computed. This new price in the local minimum may differ from the price 106 in the local minimum 104, since it may be based on a new equilibrium price. However, when the good of the user 18 is re-introduced, step 53 is ignored due to the fact that the maximum offering period has been extended according to step 63. Subsequently, according to step 54, the price function 96 is generated anew by the price variation unit 32, and is carried out according to step 55 of the actual sales process.

In the present case it is relevant that the positions of the local minimum 104, of the local maximum 110, and of the end 114 of the offer are independent of the actual maximum offering period on which a sales process is based. This means that the price function 96 has the same basic form, regardless of the maximum offering period for a sales process, but that the respective starting price 42, the respective actual minimum price 94, and the respective price 106 in the local minimum 104 may change. Similarly, the respective maximum price 102, which is computed as a function of the particular price 106 in the local minimum 104, may also change. This is relevant due to the fact that, based on the proposed method, sales processes may now be regarded as occurring within a standardized offering period. Decoupled from the actual maximum offering period 90, the purchase price 120, and thus, an equilibrium price for the good offered by the user 18, may be determined within the limits set by the user 18 for the starting price 42 and the minimum price 44.

The method described above has the following advantages:

The division of the maximum offering period 90 into the time periods 108, 109, and 116, each having substantially the same length, equally favors the interests of offering users, inquiring users, and the operator of the trading platform 24. The decrease in the purchase price from the starting price 42 to the price 106 in the local minimum 104 over the time period 108 favors the interests of inquiring users, who have an interest in a falling price. The rising price within time period 109, from the price 106 in the local minimum 104 back to the starting price 42, favors the interests of offering users, who prefer to avoid an excessive price drop for the offered good. In this regard, the price increase within the time period 109 ensures the price level of the offered good. Lastly, the drop in price within the time period 116 favors the interests of all participants, namely, the interest of inquiring users in a falling price, of offering users in selling the good according to a "final sale," and the interest of the operator of the trading platform 24, likewise in selling the good.

In particular, providing the local minimum 104 results in a speeding-up of purchasing decisions. Unlike in so-called "bid down" or "sell down" auctions, inquiring users do not delay their purchasing decision for a certain period of time in order to speculate on a continuously falling price. In practice, a purchasing decision by an inquiring user is therefore generally made immediately after the local minimum 104 is passed through, when the price begins to rise once again. As mentioned, at the same time this also meets the interests of the offering user in preventing an excessive price drop. As the result of purchasing decisions which are available more quickly than for conventional methods, the trading time or award period 118 is decreased overall, so that within a predefined time period goods may be traded more quickly, using the trading platform 24. At the same time, the data traffic between the users 18 to 22 and the computer system 10 is reduced.

The purpose of shortening the maximum offering period 90 to a new standardized maximum offering period 90 in the event of a purchasing decision is to further increase the quantity of transferred goods. Since the presence of a purchasing decision after the award period 118 indicates that a purchaser for the good offered by the user 18 has been found within this trading time, it is meaningful to include this trading time for subsequent sales processes for identical goods in the determination of the new standardized maximum offering period, provided that the time is not less than a predefinable minimum offering period.

The extension of the maximum offering period in step 63 for unsold goods is in the interest of the offering user in selling his goods. If a purchasing decision by an inquiring user is not made until a subsequent sales process, i.e., in the first, second, third, . . . iteration of the sales process 50, the computation of the new standardized maximum offering period is to be based on the award period within the sales process in which a purchasing decision is made. This provides long-term assurance of a shortened standardized maximum offering period, since the relative position of the purchasing decision within the price function 96 is the only critical factor. Thus, for this purpose as well, it is advantageous that the positions of the local minimum 104 and of the local maximum 110 in the price function 96 are independent of the actual maximum offering period 90.

Including the equilibrium price in the determination of the price 106 in the local minimum 104 allows the ideal market price for a traded good to be determined over the long term. When the actual purchase prices are stored as a function of time in the memory unit 26, according to an ideally functioning exchange market, an actual, genuine purchase price may be determined as a function of time which favors the interests of offering users as well as inquiring users.

The use of random functions in determining the actual minimum price 94 based on the minimum price 44 in step 51 and in the extension of the maximum offering period in step 63 ensures that the price function 96, in particular the absolute position of the local minimum 104 together with the price 106 in the local minimum 104 and the time period 108, cannot be discovered by users who observe the trading platform 24 over the long term. This ensures that purchasing decisions by inquiring users are based solely on the current price for the offered good, and in particular are not artificially delayed. In turn, this ensures proper functioning of the method.

Lastly, a short-term increase in the purchase price is ensured by providing the absolute maximum 100 immediately after the start 98 of the offer. This takes into account the fact that for a certain type of goods, in particular luxury goods, inquiring users are willing to pay a purchase price that is above the starting price 42. In this case, providing the local maximum 100 allows a particularly short award period 118, and is used to further increase the number of goods traded via the trading platform 24.

The computer system 10 also includes a category association unit 122 which is connected to the memory unit 26 and the price variation unit 32. The category association unit 122 may likewise be implemented in the computer system 10 via hardware or software, for example in an integrated circuit and/or as a computer program that is executable on a microprocessor, for example written in a runtime interpreter language or in a compiler language. The purpose of the category association unit 122 is discussed below.

As mentioned, information concerning the goods traded via the trading platform 24 is stored in the database 28. Identical and similar goods can be classified in one of a plurality of categories. In the present context, similar goods are regarded, for example, as goods having common features, for example in their material composition, their customary intended purpose, their customary use, their characteristic features and suitability as competing or mutually complementary goods or services, their manufacturing site, their sales channels, or their sales or service delivery (material relatedness).

For identical and similar goods, it is assumed that such goods exhibit the same or at least a similar trading pattern for sale via the trading platform 24. An at least similar award period 118, at least in relation to the maximum offering period 90, as well as a similar purchase price 120 in relation to the starting price 42 and to the actual minimum price 94 (ratio of the difference between the purchase price 120 and the actual minimum price 94 relative to the difference between the starting price 42 and the actual minimum price 94), are regarded as the same or a similar trading pattern. The initial classification of the goods into categories for storage in the database 28 is based on an expected trading pattern and the above-mentioned material relatedness.

By use of the category association unit 122 when sales processes have been ended, it may be determined whether the classification of a certain good into a category is still meaningful under the above assumptions, or whether goods of this type should be stored in a different category for future sales processes, it being possible, if necessary, to establish a new category in the database 28 for a good of this type.

For example, after conclusion of the sales process for the good offered by the user 18, the award period 118 and the purchase price 120 are compared to the particular award periods and purchase prices for goods belonging to the same category as the good sold by the user 18. If the category association unit 122 determines that at least the award period or the purchase price has a predefinable minimum deviation from the average award period or the average purchase price, a change in the category association of a good of this type may be made. It is also conceivable for a multiplicity of sales processes of identical goods to first be evaluated before a change in the category association is initiated.

A change in the category association may be made automatically, for example, by the category association unit 122, as mentioned, storing goods of this type for future sales processes in a different category, or even establishing a completely new category in the database 28. Additionally or alternatively, it may be provided that a system administrator of the trading platform 24 is notified. Based on the notification, the system administrator may decide whether goods of this type should be stored in a different category, and/or whether a new category should be established for goods of this type.

The invention claimed is:

1. Method for operating a trading platform for selling goods using a computer system, the computer system including a communication interface configured for an exchange of information between users and the computer system via at least one communication network, a memory unit for storing information associated with a good to be sold, and a price variation unit, connected to the memory unit and the communication interface, for varying a price associated with the good as a function of time, based on a parameterized price function, the method comprising:

carrying out, via the trading platform, a sequence of sales processes for selling the good, in each respective sales process of the sequence of sales processes a current price of the good determined by the price variation unit according to the price function being provided to a user via the at least one communication network, transmitting by the user to the computer system via the at least one communication network a purchasing decision for purchasing the good at the current price of the respective sales process, wherein:

during each of the respective sales processes, beginning from a start of an offer in which the good is offered at a starting price, the current price provided to the user drops according to the price function during a maximum offering period, in which no purchasing decision is made, until an end of the offer, in which the good is offered at a minimum price that is below the starting price, the price function starting at the starting price and passing through at least one local minimum before rising and subsequently decreasing to the minimum price between the start of the offer and the end of the offer of each of the respective sales process;

the starting price is specified to the price variation unit, before the start of the sequence of sales processes, by a seller offering the good;

the minimum price is specified to the price variation unit, before the start of the sequence of sales processes, by the seller offering the good;

for each of the respective sales processes subsequent to an initial sales process, the starting price and the minimum price are set based on the starting price and the minimum price specified by the seller before the start of the sequence of sale processes; and a current one of the respective sales processes being carried out is terminated when there is a purchasing decision by the user at the current price of the respective sales process.

2. Method according to claim 1, wherein the at least one local minimum comprises one local minimum.

3. Method according to claim 1, wherein the price variation unit determines the price in the at least one local minimum based on at least one prior sales process for an identical good of a prior sequence of sales processes.

4. Method according to claim 3, wherein the price variation unit, in order to determine the price in the at least one local minimum, takes into account a purchase price for an identical good of at least one prior sequence of sales processes.

5. Method according to claim 4, wherein for determining the price in the at least one local minimum, the price variation unit determines a ratio from a difference between the purchase price and the minimum price relative to a difference between the starting price and the minimum price of the at least one prior sequence of sales processes, and and determines the price in the local minimum as the minimum price plus the ratio times the difference between the starting price and the minimum price of the upcoming sales process.

6. Method according to claim 3, wherein the price variation unit takes a plurality of prior sequences of sales processes into account.

7. Method according to claim 6, wherein the plurality of prior sequences of sales processes are weighted differently in the determination.

8. Method according to claim 1, wherein the price function passes through at least one subsequent maximum after passing through the at least one local minimum and before the end of the offer.

9. Method according to claim 8, wherein the price function passes through exactly one subsequent maximum after passing through the at least one local minimum and before the end of the offer.

10. Method according to claim 9, wherein the price in the subsequent maximum is equal to the starting price.

11. Method according to claim 8, wherein during each of the respective sales processes of the sequence of sales processes, a ratio of a time period from the start of the offer to the at least one local minimum on the one hand to a time period from the at least one local minimum to the at least one subsequent maximum on the other hand is independent of the maximum offering period of the sales process.

12. Method according to claim 8, wherein during each of the respective sales processes of the sequence of sales processes, a time period from the start of the offer to the at least one local minimum is the same or substantially the same as a time period from the at least one local minimum to the at least one subsequent maximum.

13. Method according to claim 8, wherein during each of the respective sales processes of the sequence of sales processes, a ratio of a time period from the at least one local minimum to the at least one subsequent maximum on the one hand to a time period from the at least one subsequent maximum to the end of the offer on the other hand is independent of the maximum offering period of the sales process.

14. Method according to claim 8, wherein during each of the respective sales processes of the sequence of sales process, a time period from the at least one local minimum to the at least one subsequent maximum is the same or substantially the same as a time period from the at least one subsequent maximum to the end of the offer.

15. Method according to claim 8, wherein during each of the respective sales processes of the sequence of sales processes, the ratio of a time period from the start of the offer to the at least one local minimum on the one hand to a time period from the at least one subsequent maximum to the end of the offer on the other hand is independent of the maximum offering period for the sales process.

16. Method according to claim 8, wherein during each of the respective sales processes of the sequence of sales processes, a time period from the start of the offer to the at least one local minimum is the same or substantially the same as a time period from the at least one subsequent maximum to the end of the offer.

17. Method according to claim 1, wherein during each of the respective sales processes of the sequence of sales processes, the price function passes through at least one preceding maximum after the start of the offer and before the at least one local minimum.

18. Method according to claim 17, wherein the price function passes through exactly one preceding maximum.

19. Method according to claim 18, wherein the price in the preceding maximum is higher than the starting price.

20. Method according to claim 1, wherein during a current one of the sales processes of the sequence of sales processes, an actual minimum price is determined by the price variation unit based on the minimum price specified to the unit by the seller before the start of the sequence of sales processes, the actual minimum price being higher than the specified minimum price.

21. Method according to claim 20, wherein the actual minimum price is determined by the price variation unit by making use of a random principle.

22. Method according to claim 20, wherein the price variation unit ensures that the actual minimum price does not exceed a predefinable minimum threshold price.

23. Method according to claim 1, wherein the price variation unit determines the maximum offering period as a function of at least one prior sales process for the same good or at least one prior sequence of sales processes for an identical good.

24. Method according to claim 1, wherein the price variation unit extends the maximum offering period of a further sales process in the sequence of sales processes.

25. Method according to claim 24, wherein the price variation unit doubles or substantially doubles the maximum offering period for the further sales process relative to the maximum offering period of the completed sales process.

26. Method according to claim 24, wherein the price variation unit determines the maximum offering period for the further sales process by making use of a random principle.

27. Method according to claim 24, wherein in the event it is determined that a change in price per unit time for an upcoming sales process in the sequence of sales processes is less than a lower threshold value, the upcoming sales process is cancelled, and a message to this effect is sent to the seller of the good.

28. Method according to claim 1, wherein when a purchasing decision is present during the respective sales process, the maximum offering period of a further sales process in a subsequent sequence of sales processes for an identical good is decreased.

29. Method according to claim 28, wherein a period of time that has actually elapsed from the start of the offer to the purchasing decision in a completed sales process is taken into account by the price variation unit in determining the maximum offering period for the further sales process.

30. Method according to claim 29, wherein the maximum offering period of the further sales process is determined from a ratio of an elapsed period of time of the completed sales process relative to the maximum offering period of the completed sales process, multiplied by a standardized maximum offering period which is stored for an identical good at the time of the determination, the standardized maximum offering period being the shortest elapsed period of time for a purchasing decision in a prior sequence of sales processes for an identical good.

31. Method according to claim 30, wherein the price variation unit determines whether the maximum offering period for the further sales process is less than a predefinable minimum offering period, the stored standardized maximum offering period being selected as the maximum offering period for the further sales process.

32. Method according to claim 1, wherein the starting price for the sales processes subsequent to the initial sales process comprises the starting price specified by the seller before the start of the sequence of sales processes.

33. Computer system, comprising:
a communication interface configured for an exchange of information between users and the computer system via at least one communication network,
a memory unit for storing information associated with a good to be sold using the computer system, and
a price variation unit, connected to the memory unit and the communication interface, for varying a price associated with the good as a function of time, based on a parameterized price function,
the computer system being designed and programmed to carry out a method for operating a trading platform for selling goods, in which method the trading platform carries out a sequence of sales processes for selling the good, in each respective sales process of the sequence of sales processes a current price of the good determined by the price variation unit according to the price function being provided to a user via the at least one communication network, wherein:
the user transmits to the computer system via the at least one communication network a purchasing decision for purchasing the good at the current price of the respective sales process,
during each of the respective sales processes, beginning from a start of an offer in which the good is offered at a starting price, the current price provided to the user drops according to the price function during a maximum offering period, in which no purchasing decision is made, until an end of the offer, in which the good is offered at a minimum price that is below the starting price, the price function starting at the starting price and passing through at least one local minimum before rising and subsequently decreasing to the minimum price between the start of the offer and the end of the offer of each of the respective sales process;
the starting price is specified to the price variation unit, before the start of the sequence of sales processes, by a seller offering the good;
the minimum price is specified to the price variation unit, before the start of the sequence of sales processes, by the seller offering the good;
for each of the respective sales processes subsequent to an initial sales process, the starting price and the minimum price are set based on the starting price and the minimum price specified by the seller before the start of the sequence of sale processes; and
a current one of the respective sales processes being carried out is terminated when there is a purchasing decision by the user at the current price of the respective sales process.

34. Trading platform for selling goods using a computer system,
the computer system comprising a communication interface configured for an exchange of information between users and the computer system via at least one communication network, a memory unit for storing information associated with a good to be sold, and a price variation unit, connected to the memory unit and the communication interface, for varying a price associated with the good as a function of time, based on a parameterized price function, the method comprising:
carrying out, via the trading platform, a sequence of sales processes for selling the good, in each respective sales process of the sequence of sales processes a current price of the good determined by the price variation unit according to the price function being provided to the user via the at least one communication network,
transmitting by the user to the computer system via the at least one communication network a purchasing decision for purchasing the good at the current price of the respective sales process,
wherein:
during each of the respective sales processes, beginning from a start of an offer in which the good is offered at a starting price, the current price provided to the user drops according to the price function during a maximum offering period, in which no purchasing decision is made, until an end of the offer, in which the good is offered at a minimum price that is below the starting price, the price function starting at the starting price and passing through at least one local minimum before rising and subsequently decreasing to the minimum price between the start of the offer and the end of the offer of each of the respective sales process;

the starting price is specified to the price variation unit, before the start of the sequence of sales processes, by a seller offering the good;

the minimum price is specified to the price variation unit, before the start of the sequence of sales processes, by the seller offering the good;

for each of the respective sales processes subsequent to an initial sales process, the starting price and the minimum price are set based on the starting price and the minimum price specified by the seller before the start of the sequence of sale processes; and a current one of the respective sales processes being carried out is terminated when there is a purchasing decision by the user at the current price of the respective sales process.

\* \* \* \* \*